United States Patent Office 3,480,959
Patented Nov. 25, 1969

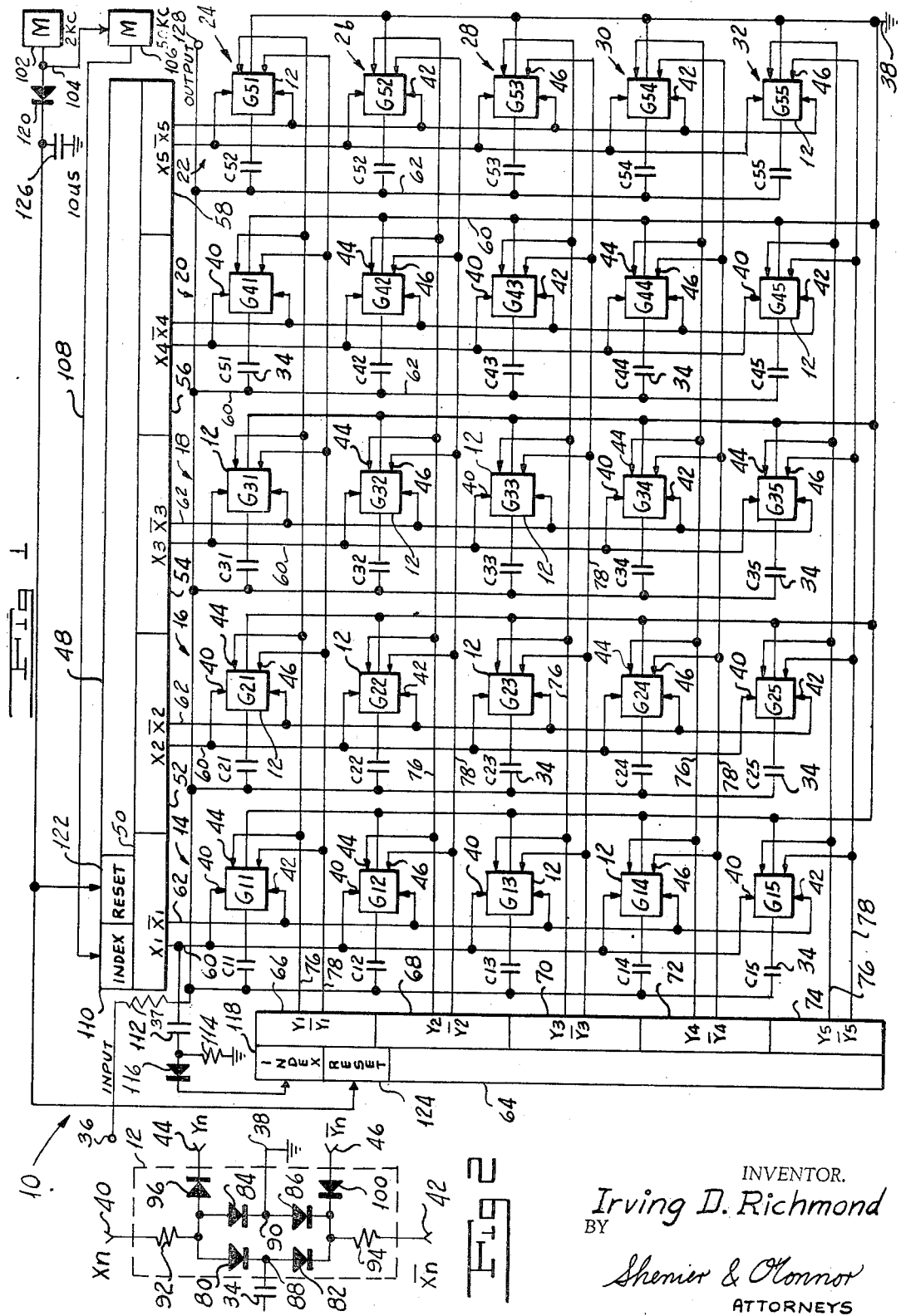

3,480,959
RANGE GATED INTEGRATOR
Irving D. Richmond, Norwalk, Conn., assignor to United Aircraft Corporation, East Hartford, Conn., a corporation of Delaware
Filed May 7, 1968, Ser. No. 727,226
Int. Cl. G01s 7/28
U.S. Cl. 343—17.1    9 Claims

ABSTRACT OF THE DISCLOSURE

A range gated integrator in which a plurality of diode gating circuits corresponding in number to the number of range values to be provided are arranged in rows and columns in a matrix with each gate connected in series between ground and a respective integrating capacitor to which the radar return is applied. The outputs of respective column and row registers control the matrix gating circuits. Transmision of a pulse initiates clock pulses which index the column register, which indexes the row register once for each complete count of the column register, thus sequentially to render the gates of the matrix conductive.

BACKGROUND OF THE INVENTION

There are known in the prior art range gated integrators in which a radar return is sequentially switched to a plurality of respective integrator capacitors at times corresponding to various range values following transmission of a pulse. A number of arrangements have been used in the prior art to achieve the switching operation. In one system a string of blocking oscillators are fired in domino fashion with each of the oscillators operating a respective diode gate to connect an integrating capacitor to ground. Not only does each of the blocking oscillators involve the use of a transformer but as many blocking oscillators as there are integrating capacitors are required in such a system.

In another arrangement which has been employed in the prior art a shift register having as many output places as there are range values puts out a number of bits equal to the number of range values to actuate the diode gates. Owing to the fact that a clock pulse goes to every bit and is coupled to the output lead, more noise is introduced into this system than exists on the input lead.

From the foregoing it will be appreciated that each of the range gated integrator systems described above is relatively complicated and expensive. Each of the arrangements requires as many drivers as there are range values to be provided.

I have invented a simplified range gated integrator for sequentially switching radar return to a plurality of integrators corresponding to respective discrete ranges. My range gated integrator affords a substanital reduction in the number of components from the number required in range gated integrators of the prior art. My range gated integrator is less expensive to construct than are range gated integrators of the prior art. My integrator minimizes noise in the output lead.

SUMMARY OF THE INVENTION

One object of my invention is to provide a simplified range gated integrator for sequentially switching radar returned to a plurality of integrators corresponding to a number of respective discrete ranges.

Another object of my invention is to provide a range gated integrator which affords a substantial reduction in the number of components from the number required in range gated integrators of the prior art.

A further object of my invention is to provide a range gated integrator which is less expensive to construct than are range gated integrators of the prior art.

Still another object of my invention is to provide a range gated integrator which minimizes noise in the output lead.

Other and further objects of my invention will appear from the following description.

In general my invention contemplates the provision of a range gated integrator in which I arrange a plurality of diode gating circuits corresponding in number to the number or range values desired in the rows and columns of a matrix with each gate being connected in series between ground and a respective integrating capacitor. Transmission of a burst of energy from the radar system initiates a train of clock pulses for indexing a column shift register, one output of which indexes a row shift register once during each complete count of the column register to cause the registers to provide outputs for sequentially actuating the diode gating circuits of the matrix.

BRIEF DESCRIPTION OF THE DRAWINGS

In the accompanying drawings which form part of the instant specification and which are to be read in conjunction therewith and in which like reference numerals are used to indicate like parts in the various views:

FIGURE 1 is a schematic view of one form of my range gated integrator.

FIGURE 2 is a schematic view illustrating the details of one of the diode gating circuits of the form of my range gated integrator illustrated in FIGURE 1.

DESCRIPTION OF THE PREFERRED EMBODIMENT

Referring now to the drawings, my range gated integrator includes a matrix, indicated generally by the reference character 10, of a plurality of gating circuits 12 to be described in more detail hereinbelow. I arrange the gating circuits 12 to form a plurality of respective columns, indicated generally by the reference characters 14, 16, 18, 20 and 22, and a plurality of respective rows, indicated generally by the reference characters 24, 26, 28, 30 and 32. For purposes of simplicity in explanation, I have designated each of the gating circuits 12 in FIGURE 1 by a block carrying a legend G followed by a two-digit number, the first digit of which indicates the column to which the circuit belongs and the second digit of which indicates the row to which the gating circuit belongs. For example, the gating circuit in a location corresponding to the intersection of the first column 14 with the second row 16 is designated G12. Similarly, the gating circuit located at the intersection of the fourth column 20 and the third row 28 is designated G43.

I connect a respective integrating capacitor 34 and a gate 12 in series between an integrating resistor 37 connected to an input terminal 36 and ground. Again, for purposes of simplicity in explanation, I have indicated each of the capacitors 34 in FIGURE 1 by the legend C followed by a two-digit number, which number is the same as that of the corresponding gate designation. That is, capacitor C32 is connected to gate G32 and capacitor C54 is connected to gate G54, and so forth. I apply the received signal from a radar receiver (not shown) to the input terminal 36 of the matrix 10.

As will be explained more fully hereinbelow, each of the gating circuits 12 is normally nonconductive so that the signal input at terminal 36 will not be fed into the corresponding capacitor 34. Each of the gating circuits 12 includes two pairs of control input terminals 40 and 42 and 44 and 46. I provide actuating signals at the control terminals 40, 42, 44 and 46 in such a way as sequentially to render the gating circuits conductive. As will be apparent from the description hereinbelow, first all of the gating circuits of the row 24 are sequentially rendered conductive, then all of the gating circuits of the row 26 and so forth throughout the matrix. Thus, circuits G11, G21, G31, G41, G51, G12, G22, and so forth, are conductive in succession. My arrangement is such that only one of the gating circuits is conductive in any particular interval.

I provide my range gated integrator with a column stepping register 48 comprising as many output sections as there are columns of circuits 12. In the particular arrangement shown wherein there are five columns, the register 48 includes five output sections 50, 52, 54, 56 and 58 associated with the respective columns 14, 16, 18, 20 and 22. Each of the output sections of the register when active provides an output bit on a conductor 60 and a complement on an output conductor 62. By way of explaining the operation of the register 48, I have designated the respective bit and complement outputs of the respective output sections as $X_n$ and $\overline{X}_n$ wherein the subscripts $n=1$ to 5 are employed for the respective output sections. The arrangement of my register is such that only one of the sections 50, 52, 54, 56 and 58 provides outputs at any one time. Moreover, presence of an output is represented by a positive potential whereas absence of an output is represented by a negative potential. When a positive output exists at any bit output, all of the rest of the bit outputs of the register 48 are negative potentials. The complements, of course, are negative when the bits are positive, and vice versa.

My matrix 10 is also provided with a row register 64 having five respective output sections 66, 68, 70, 72 and 74 corresponding to the number of rows of the matrix. Each of the output sections of register 64 includes a bit output conductor 76 and a complement output conductor 78. When any bit is positive, all of the other bits are negative. Moreover, as is understood in the art, all complements are of opposite polarity to their corresponding bit places. By way of simplicity in exposition, I have designated the bit outputs of the register 64 as Y followed by a suitable subscript and the complement outputs as $\overline{Y}$ followed by a suitable subscript.

I connect each bit output conductor 60 of the output sections 50, 52, 54, 56 and 58 to the control input terminals 40 of the gating circuits of the corresponding respective columns 14, 16, 18, 20 and 22. That is, I apply the bit signal $X_1$ to the control terminals 40 of all of the gating circuits G11 through G15. Similarly, the output bit $X_3$ is applied to the control terminals 40 of all of the gating circuits G31 to G35.

I connect the output conductors 62 of all of the output sections 50, 52, 54, 56 and 58 to the control terminals 42 of the gating circuits 12 of the respective columns 14, 16, 18, 20 and 22. That is, the complement $\overline{X}_2$ is connected to the control terminals 42 of all of the gating circuits G21 to G25. Similarly, the complement output $\overline{X}_5$ is applied to the control terminals 42 of all of the gating circuits G51 to G55. The remaining connections from register 48 to the various gates 12 are analogous and, for purposes of simplicity, will not be detailed.

I apply the signal on output conductor 76 of each of the output sections 66, 68, 70, 72 and 74 to the control terminals 44 of the gating circuits 12 of the respective rows 24, 26, 28, 30 and 32. Stated otherwise, I apply the row register bit output signal $Y_1$ to the control terminals 44 of all of the gating circuits G11 to G51. Similarly, for example, the bit output signal $Y_3$ is applied to the control terminals 44 of all of the gating circuits G13 to G53.

I connect the complement output conductors 78 of the row register sections 66, 68, 70, 72 and 74 to the respective groups of control terminals 46 of the rows 24, 26, 28, 30 and 32. Stated otherwise, complement outputs such as the output $\overline{Y}_2$ are applied to control terminals 46 such as the control terminals 46 of the group of gates G12 to G52. The remaining connections from register 64 to the various gating circuits are analogous to those just described.

From the above description it will be apparent that each of the gating circuits 12 receives two pairs of control signals, one from the column register 48 and the other from the row register 64. For example, gate G11 receives bit signal $X_1$, complement signal $\overline{X}_1$ and bit signal $Y_1$ and complement signal $\overline{Y}_1$. Similarly, by way of example, gate G32 receives bit and complement signals $X_3$ and $\overline{X}_3$ as well as bit and complement signals $Y_2$ and $\overline{Y}_2$.

Each of my gating circuits is so arranged that it will conduct when and only when the column bit signal $X_n$ thereto is positive, the column complement signal $\overline{X}_n$ thereto is negative, the row complement signal $Y_n$ thereto is positive and the column complement signal $\overline{Y}_n$ is negative. This will readily be apparent from the following description.

Referring to FIGURE 2, I have shown the details of one of the gating circuits 12 having a control terminal 40 to which signal $X_n$ is applied, a control terminal 42 to which signal $\overline{X}_n$ is applied, a control terminal 44 to which a signal $Y_n$ is applied and a control terminal 46 to which signal $\overline{Y}_n$ is applied. The gating circuit 12 includes four diodes 80, 82, 84 and 86 so connected as to provide an input terminal 88 to which the associated capacitor 34 is connected and an output terminal 90 connected to the ground conductor 38. A resistor 92 is adapted to apply the signal $X_n$ at terminal 40 to the common terminal of diodes 80 and 84. Another resistor 94 is adapted to apply the complement signal $\overline{X}_n$ at terminal 42 to the common terminal of diodes 82 and 86. An inhibiting diode 96 is adapted to apply the signal $Y_n$ at terminal 44 to the common terminal of diodes 80 and 84. Another inhibiting diode 100 applies the complement signal $\overline{Y}_n$ to the common terminal of diodes 82 and 86.

As has been explained hereinabove, gating circuit 12 will be conductive to connect terminals 88 and 90 when and only when $X_n$ is positive, $\overline{X}_n$ is negative, $Y_n$ is positive and $\overline{Y}_n$ is negative. The presence of a positive signal at terminal 40 tends to render diodes 80 and 84 conductive; a positive signal at terminal 44 prevents conduction through diode 96; a negative signal at terminal 42 renders diodes 82 and 86 conductive; while a negative signal at terminal 46 will prevent conduction through diode 100. Under these conditions it will readily be apparent that capacitor 34 is effectively connected to ground conductor 38.

Considering the other possibilities for the conditions of the control input signals to the circuit 12, assuming that $X_n$ is negative and $Y_n$ is positive, or that $\overline{X}_n$ is positive and $\overline{Y}_n$ is negative, under these conditions the negative signal at terminal 40 tends to inhibit conduction of diodes 80 and 84. Similarly, the negative signal at terminal 42 will inhibit conduction of diodes 82 and 86 and the gating circuit will be nonconductive. If, now, $X_n$ is negative, $Y_n$ is negative and both $\overline{X}_n$ and $\overline{Y}_n$ are positive, while diode 96 would be rendered conductive as well as diode 100, the signals at terminals 40 and 42 are such that there would be no potentials available tending to turn the other diodes on. The fourth possibility would be that $X_n$ is positive, $Y_n$ is negative and $\overline{X}_n$ and $\overline{Y}_n$ are correspondingly negative and positive. While the positive potential at terminal 40 is such as would tend to render diodes 80 and 84 conductive, the signal at terminal 44 which causes diode 96 to conduct renders the signal at terminal 40 ineffective to inhibit conduction through diodes 80 and 84. Similarly, while the presence of the negative signal at terminal 42 tends to render diodes 82 and 86 conductive, the positive signal at terminal 46 inhibits a signal at terminal 42. Thus, it will be seen that each of the circuits 12 so operates as to be conductive when and only when $X_n$ is positive, $Y_n$ is positive and both $\overline{X}_n$ and $\overline{Y}_n$ are negative.

I provide by range gated integrator with means for operating the registers 48 and 64 in such a way that the gating circuits 12 of the matrix 10 are sequentially rendered conductive in the order described hereinabove. The radar system with which I use my range gated integrator includes a transmitter multivibrator 102 operating at a frequency of, for example, 2 kc. A conductor 104 applies the output of the multivibrator 102 to a clock pulse generator multivibrator 106 operating at a frequency of around 50 kc. to synchronize operation of multivibrator 106 with transmission of radar pulses. A channel 108 applies the clock pulses produced by multivibrator 106 to the indexing section 110 of the register 48. It will readily be appreciated that in operation of the register 48 in response to the clock pulses on channel 108, once during each cycle of operation of register 48, section 50 provides an output pulse on conductor 60. A differentiating circuit comprising a series capacitor 112 and a parallel resistor 114 couple the output of section 50 to a rectifier 116 which applies a pulse to the indexing section 118 of register 64.

In order to synchronize the operation of the registers 48 and 64 with the transmission of information from the radar, I reset each of the registers 48 and 64 a short time following the transmission of a radar pulse to permit them to begin their operation in response to the pulses on channel 108 upon the occurrence of the next clock pulse following the reset. I achieve this operation by coupling pulses from multivibrator 102 through a diode 120 to the reset sections 122 and 124 of registers 48 and 64. A capacitor 126 connected between the diode 120 and ground provides a short time delay following transmission of a pulse before the registers are reset. It will readily be appreciated that, as the capacitors C11 to C55 are sequentially connected to ground conductor 38, there is provided at an output terminal 128 a signal representing the integrated return at a plurality of respective ranges corresponding to the number of capacitors.

In operation of my range gated integrator, multivibrator 102 produces an output pulse at each burst of energy from the radar system. Diode 120 and capacitor 126 apply a reset pulse to the reset sections 122 and 124 of each of the registers 48 and 64 a short time of about 10 μs. after transmission of the energy. At the same time channel 104 actuates multivibrator 106 to synchronize its operation with the transmission of energy. The first pulse on channel 108 following resetting of the two registers 48 and 64 indexes register 48 to produce a bit output at section 50 which is applied to the indexing section of register 64 to cause that register to provide a bit output. At this time both the $X_1$ and $Y_1$ signals to terminals 40 and 44 of gating circuit G11 are positive and the $\overline{X}_1$ and $\overline{Y}_1$ inputs to terminals 42 and 46 of gating circuit G11 are negative. Under these conditions, as has been described hereinabove, the gating circuit G11 conducts to couple capacitor C11 to ground conductor 38. Thus, received information at terminal 36 is now coupled to capacitor C11. It will readily be appreciated that capacitor C11 corresponds to the shortest range of the system.

The next clock pulse on channel 108 indexes register 48 to provide a bit output $X_2$ at section 52. Register 64, however, is not indexed at this time but continues to carry an output bit $Y_1$ from section 66. At this time both the $X_2$ and $Y_1$ outputs are positive with $\overline{X}_2$ and $\overline{Y}_2$ being negative so that gate G21 is conductive to cause input information to be applied to integrating capacitor C21. It is to be remembered that when register 48 was indexed, bit output $X_1$ returned to the negative value so that gate G11 returned to its nonconductive state.

The operation described above continues and gates G31, G41 and G51 are sequentially rendered conductive. Following the actuation of gate G51, the next clock pulse on conductor 108 causes section 50 to produce a bit output which is passed to the indexing section 118 of register 64 to shift the bit output from $Y_1$ of section 66 to $Y_2$ of section 68. Under these conditions, gating circuit G12 is conductive to cause input information to be applied to capacitor C12. The remaining gates of row 26 are sequentially rendered conductive and then the gates of row 28, row 30 and row 32 until, finally, gate G55 is rendered conductive to provide a sample corresponding to the greatest range for the system. At this time multivibrator 102 produces its next pulse and a short time after the occurrence thereof, both registers are reset and the system begins to receive information from the next transmitted pulse.

It is to be understood that while I have illustrated only five rows and five columns of gating circuits and corresponding capacitors, in practice many more may be used. For example, in one particular instance there may be a register 48 having sixteen places and a register 64 having eight places so that 128 samples are achieved. The amount of time each gating circuit is conductive can, of course, be controlled by varying the frequency of the clock pulse generator 106. In any embodiment, my system requires only a relatively few driving elements as contrasted with systems of the prior art.

It will be seen that I have accomplished the objects of my invention. I have provided a range gated integrator which is substantially simpler than are range gated integrator systems of the prior art. My system requires an appreciably smaller number of components than do systems of the prior art. It is less expensive to construct than are systems of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a range gated integrator, a gating circuit comprising, an input terminal, an output terminal, a first pair of control signal terminals including a first terminal and a second terminal, a second pair of control terminals comprising a first terminal and a second terminal, and means responsive to the concomitant presence of positive signals at the first terminal of the first pair and at the second terminal of the second pair and of negative signals at the second terminal of the first pair and at the first terminal of the second pair for coupling an input signal at said input terminal to said output terminal.

2. A gating circuit as in claim 1 in which said means responsive to said signals comprises two pairs of back-to-back diodes connected in parallel between said input and output terminals, each pair of said diodes having a common terminal, means connecting the first terminal of the first pair of terminals to the common terminal of one of said pairs of diodes and means connecting the second terminal of the second pair of terminals to the common terminal of the other pair of diodes.

3. A gating circuit as in claim 2 including first and second inhibiting diodes, means connecting said first inhibiting diode between the second terminal of the first pair of terminals and the common terminal of one of said pairs of diodes and means connecting the second inhibiting diode between the first terminal of the second pair and the common terminal of the other pair of diodes.

4. A range gated integrator including in combination, a source of an input signal, a matrix of capacitors comprising a number of rows and a number of colums, a number of gates corresponding to the number of capacitors in the matrix, means including the gates for coupling the input signal to the capacitors, means comprising a first counter providing a number of outputs corresponding to the number of rows, second means comprising a second counter providing outputs corresponding to the number of columns, means for applying said first and second counter outputs respectively to the rows and columns of said gates, a source of clock pulses, means responsive to said clock pulses for indexing one of said counters and means responsive to said one counter for indexing the other counter.

5. A range gated integrator for use in a radar system transmitting pulses of energy and adapted to receive a signal resulting from said pulses including in combination, a matrix comprising an input terminal to which said received signal is applied, a plurality of storage capacitors, a plurality of normally nonconductive devices and means connecting each of said capacitors and a respective device in series between said input terminal and ground with each of said capacitors and its associated device disposed in a position in a row of said matrix and in a column of said matrix, a first counter adapted sequentially to produce outputs in a plurality of places, means for applying the outputs of the first counter places respectively to the columns of devices of said matrix, a second counter adapted sequentially to produce outputs in a plurality of places, means for applying the outputs of the second counter places respectively to the rows of devices of said matrix, each of said devices being rendered conductive in response to the concomitant application thereto of the outputs of a first counter place and a second counter place, means responsive to said transmitted pulses for generating a train of clock pulses, means for applying said clock pulses to said first counter to step the same and means reponsive to operation of said first counter for stepping said second counter once for each cycle of said first counter.

6. A range gated integrator as in claim 5 including means responsive to said transmitted pulses for resetting said counters.

7. A range gated integrator for use in a radar system transmitting pulses of energy and adapted to receive a signal resulting from said pulses including in combination, a matrix comprising an input terminal to which said received signal is applied, a plurality of storage capacitors, a plurality of normally nonconductive devices and means connecting each of said capacitors and a respective device in series between said input terminal and ground with each of said capacitors and its associated device disposed in a position in a row of said matrix and in a column of said matrix, a first counter adapted sequentially to produce outputs in a plurality of places, means for applying the outputs of the first counter places respectively to the columns of devices of said matrix, a second counter adapted sequentially to produce outputs in a plurality of places, means for applying the outputs of the second counter places respectively to the rows of devices of said matrix, each of said devices being rendered conductive in response to the concomitant application thereto of the outputs of a first counter place and a second counter place, each of said devices comprising two sets of control signal input terminals, each of said devices being rendered conductive in response to the presence of a positive signal at only one control signal input signal of each of said pairs, each of said counters producing a bit output and a complement output in each of said places, means for applying the respective bit and complement outputs of the respective places of one of said counters to the control terminals of one pair of terminals of the devices of said columns and means for applying the respective bit and complement outputs of the other counter to the control terminals of the other pair of terminals of the devices of said rows.

8. A range gated integrator for use in a radar system transmitting pulses of energy and adapted to receive a signal resulting from said pulses including in combination, a matrix comprising an input terminal to which said received signal is applied, a plurality of storage capacitors, a plurality of normally nonconductive gating circuits each having an input terminal and an output terminal and a pair of control signal terminals, means connecting each of said capacitors and a respective gating circuit in series between said input terminal and ground with each capacitor and its associated gating circuit occupying a position in said matrix corresponding to a row thereof and to a column thereof, each of said gating circuits being rendered conductive in response to the concomitant presence of signals at its control terminals, a first counter having an indexing terminal, a reset terminal and a number of output sections corresponding to the number of columns in said matrix, said counter producing outputs at said output sections sequentially in response to successive pulses applied to said indexing terminal, means connecting one control terminal of each gating circuit in a matrix column to one output section of the first counter, a second counter having an indexing terminal, a reset terminal and a number of output sections corresponding to the number of rows of said matrix, said second counter producing outputs at said output sections sequentially in response to successive pulses applied to its indexing terminal, means connecting the other control terminal of each gating circuit in a matrix row to one output section of the second counter, means for applying a reset pulse to said reset terminals of said counters, means of generating a train of clock pulses, means for applying said clock pulses to the indexing terminal of said first counter and means responsive to operation of said first counter for applying a pulse to the indexing terminal of the second counter on each cycle of operation of the first counter.

9. A range-gated integrator as in claim 8 in which each of said gating circuits comprises a second pair of control signal terminals, said gating circuits being rendered conductive in response to the concomitant presence of positive potentials at the control signal terminals of the first pair and of negative potentials at the control signal terminals of said second pair, each of said counter output sections having two output lines, each of said counter output sections providing a positive potential on one of said lines and a negative signal on the other line when active and producing a negative signal on the one line and a positive signal on the other line when inactive, said means connecting said control terminals to said counter output sections comprising means connecting one control terminal of all of the first pairs of control terminals of the devices of a column of said matrix to one output line of a first counter output section, means connecting one control terminal of all of the second pairs of control terminals of the devices of a column of said matrix to the other output line of a first counter output section, means connecting the other control terminal of all of the first pairs of control terminals of the devices of a row of said matrix to one output line of a second counter output section and means connecting the other control terminal of all of the second pairs of control terminals of the devices of a row of said matrix to the other output line of a second counter output section.

References Cited
UNITED STATES PATENTS

| | | | |
|---|---|---|---|
| 2,782,303 | 2/1957 | Goldberg | 307—317 |
| 3,142,822 | 7/1957 | Martin | 343—17.1XR |
| 3,201,787 | 8/1964 | Grewe et al. | 343—17.1 XR |
| 3,230,530 | 1/1966 | Balding | 343—17.1 |
| 3,355,721 | 11/1967 | Burns | 340—166 XR |
| 3,356,998 | 12/1967 | Kaufman | 340—166 XR |

OTHER REFERENCES

RODNEY D. BENNETT, JR., Primary Examiner

H. C. WAMSLEY, Assistant Examiner

U.S. Cl X.R.

307—121; 340—166; 343—13

PO-1050
(5/69)

UNITED STATES PATENT OFFICE
CERTIFICATE OF CORRECTION

Patent No. 3,480,959      Dated November 25, 1969

Inventor(s) Irving D. Richmond

It is certified that error appears in the above-identified patent and that said Letters Patent are hereby corrected as shown below:

Column 6, line 73, "colums" should be --columns--.

Column 7, line 62, "signal" (second occurrence) should be -- terminal --.

Column 8, line 26, "means of" should be -- means for --.

SIGNED AND
SEALED
APR 28 1970

(SEAL)
Attest:

Edward M. Fletcher, Jr.
Attesting Officer

WILLIAM E. SCHUYLER, JR.
Commissioner of Patents